3,024,256
16-SUBSTITUTED 1,3-DIACYLOXYESTRA-1,3,5(10)-TRIEN-17-ONES
James Jiu, Morton Grove, Ill., assignor to G. D. Searle & Co., Chicago, Ill., a corporation of Delaware
No Drawing. Filed Feb. 20, 1961, Ser. No. 90,231
5 Claims. (Cl. 260—397.4)

This invention relates to 1,3-diacyloxyestra-1,3,5(10)-trien-17-ones and 1,3-dihydroxyestra-1,3,5(10)-trien-17-ones which are substituted in the 16-position by a hydroxy or by a halogen. More particularly, this invention relates to products of the formula

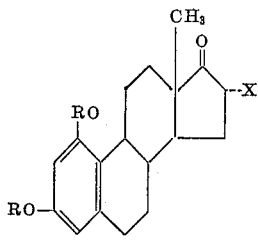

wherein R is hydrogen, lower alkanoyl, or benzoyl; X represents a member of the group consisting of hydroxy and halogen of atomic number greater than 16. Thus, the substituent in the 16-position can be hydroxy, chlorine, bromine or iodine.

The compounds of this invention are useful because of their valuable pharmacological properties. They have, for example, the capacity to decrease the serum concentration of cholesterol and the corresponding cholesterol/phospholipid ratio. They are also anti-anabolic agents and weak estrogens.

The 16-substituted 1,3-diacyloxyestra-1,3,5(10)-trien-17-ones hereof are prepared by reacting a 1,3,17-triacetoxyestra-1,3,5(10),16-tetraene with an appropriate reagent which will react with the double bond in the 16-position. Thus, reaction of the above tetraene with a halogen gives the corresponding 16α-halo-1,3-diacyloxyestra-1,3,5(10)-trien-17-one while reaction of the tetraene with perbenzoic acid gives 16α-hydroxy-1,3-diacyloxyestra-1,3,5(10)-trien-17-one. When these compounds are allowed to stand with methanol in the presence of hydrochloric acid, the corresponding 1,3-dihydroxy compounds are formed.

The following examples describe in detail certain of the compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.) and relative amounts of materials in parts by weight, except as otherwise noted.

*Example 1*

*16α-chloro-1,3-diacetoxyestra-1,3,5(10)-trien-17-one.*—A mixture of 1.5 parts of 1,3,17-triacetoxyestra-1,3,5(10),16-tetraene (preparable by the procedure of Example 1 in U.S. 2,949,477) and 1.2 parts of potassium carbonate in 192 parts of carbon tetrachloride is cooled to 0° C. Three milliliters of a 1.35 N solution of chlorine in carbon tetrachloride is added with stirring. After the reaction mixture is stirred for an additional 5 minutes, it is poured into water containing some sodium sulfite and extracted with chloroform. The combined chloroform extracts are washed with water, dried over anhydrous sodium sulfate and evaporated to dryness under reduced pressure. The residue is chromatographed on fuller's earth using ethyl acetate and benzene as developing solvents. Elution with 1 to 5% ethyl acetate in benzene (v./v.) and recrystallization of the resultant product from methanol gives 16α-chloro-1,3-diacetoxyestra-1,3,5(10)-trien-17-one melting at about 178–180° C. The product has the formula

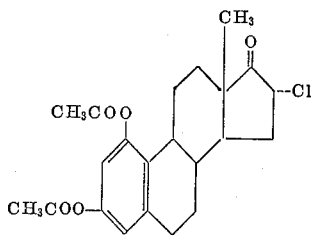

*Example 2*

*16α-bromo-1,3-diacetoxyestra-1,3,5(10)-trien-17-one.*—To a solution of 1.5 parts of 1,3,17-triacetoxyestra-1,3,5(10),16-tetraene in 192 parts of carbon tetrachloride is added 1.2 parts of potassium carbonate. The mixture is stirred and cooled in an ice-water bath. A solution of bromine in carbon tetrachloride is added to the reaction mixture in small portions over a period of about 10 minutes until the bromine coloration persists for about a minute. The carbon tetrachloride solution is poured into water containing some sodium sulfite and the resultant mixture is extracted with chloroform. The combined chloroform extracts are washed with water, dried over anhydrous sodium sulfate and evaporated to dryness under reduced pressure. The residue is chromatographed on activated magnesium silicate using ethyl acetate and benzene as developing solvents. The product obtained by eluting with 5 to 20% ethyl acetate in benzene (v./v.) is 16α-bromo-1,3-diacetoxyestra-1,3,5(10)-trien-17-one which, after recrystallization from methanol, melts at about 157–160° C. The product has the formula

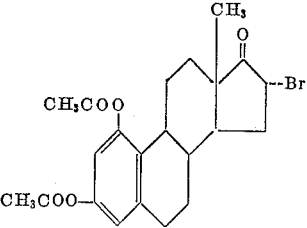

Substitution of 1,3,17-tribenzoyloxyestra-1,3,5(10),16-tetraene for the 1,3,17-triacetoxyestra-1,3,5(10),16-tetraene in the above procedure gives 16α-bromo-1,3-dibenzoyloxyestra-1,3,5(10)-trien-17-one.

*Example 3*

*16α-hydroxy-1,3-diacetoxyestra-1,3,5(10)-trien-17-one.*—To a solution of 1 part of 1,3,17-triacetoxyestra-1,3,5(10),16-tetraene in 22 parts of benzene is added 32.2 milliliters of a 0.755 N solution of perbenzoic acid in benzene. The reaction mixture is allowed to stand at room temperature for 18 hours before diluting it with benzene. The benzene solution is washed with cold dilute sodium hydroxide solution and cold sodium chloride solution. After drying the solution over anhydrous sodium sulfate, the solvent is removed under reduced pressure. The residue is recrystallized from methanol to yield 16α-hydroxy-1,3-diacetoxyestra-1,3,5(10)-trien-17-one melting at about 210–215° C. This product has the following formula

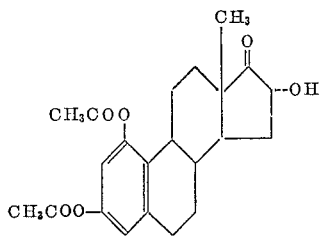

*Example 4*

*16α-bromo-1,3-dihydroxyestra - 1,3,5(10) - trien - 17-one.*—A solution of 4.7 parts of 16α-bromo-1,3-diacetoxyestra-1,3,5(10)-trien-17-one in a mixture of 115 parts of methanol with 17 parts of 15 percent hydrochloric acid is allowed to stand for 12 hours at room temperature. The reactants are dumped into cracked ice and the resultant mixture is extracted with chloroform. The chloroform extract is washed with water and then dried over anhydrous sodium sulfate. The solution is distilled at reduced pressure to remove the solvent and the residue is recrystallized from methanol to give 16α-bromo-1,3-dihydroxyestra-1,3,5(10)-trien-17-one.

What is claimed is:
1. A compound of the formula

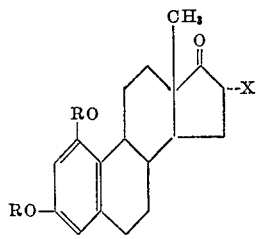

wherein R is selected from the group consisting of hydrogen, lower alkanoyl, and benzoyl and X is selected from the group consisting of hydroxy and halogen of atomic number greater than 16.

2. A compound of the formula

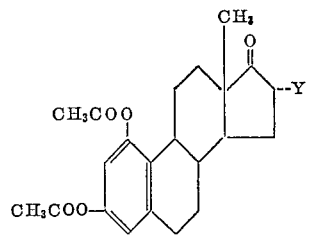

wherein Y is a halogen of atomic number greater than 16.
3. 16α-chloro-1,3-diacetoxyestra-1,3,5(10)-trien-17-one.
4. 16α-bromo-1,3-diacetoxyestra-1,3,5(10) - trien - 17-one.
5. 16α-hydroxy-1,3-diacetoxy-1,3,5(10)-trien-17-one.

No references cited.